Patented May 30, 1950

2,509,199

UNITED STATES PATENT OFFICE 2,509,199

PHARMACEUTICAL INTERMEDIATES AND PROCESS OF PREPARING THE SAME

Marjorie B. Moore and Edmond E. Moore, Waukegan, Ill., assignors to Abbott Laboratories, North Chicago, Ill., a corporation of Illinois No Drawing. Original application October 22, 1943, Serial No. 507,292. Divided and this application February 13, 1947, Serial No. 728,378

6 Claims. (Cl. 260—481)

This application is a division of our copending application, Ser. No. 507,292, filed October 22, 1943, now Patent No. 2,424,007, dated July 15, 1947.

The present invention relates to products of interest in the therapeutic field and improved processes of preparing the same. More specifically, the present invention is directed to the synthesis of intermediates for use in the preparation of certain vitamins or vitamin-like substances such as biotin of the vitamin B-complex.

The principal object of the present invention is to provide products for use in the preparation of therapeutically active compounds, including compounds used in vitamin therapy.

Another object of the present invention is to provide improved processes of preparing products for use in the preparation of therapeutically active compounds.

Other objects of the present invention will be apparent as the detailed description hereinafter proceeds.

The reactions of the present invention may be illustrated by the following formulas in which R represents a lower alkyl group and $m$ a small whole number, e. g. 1–10:

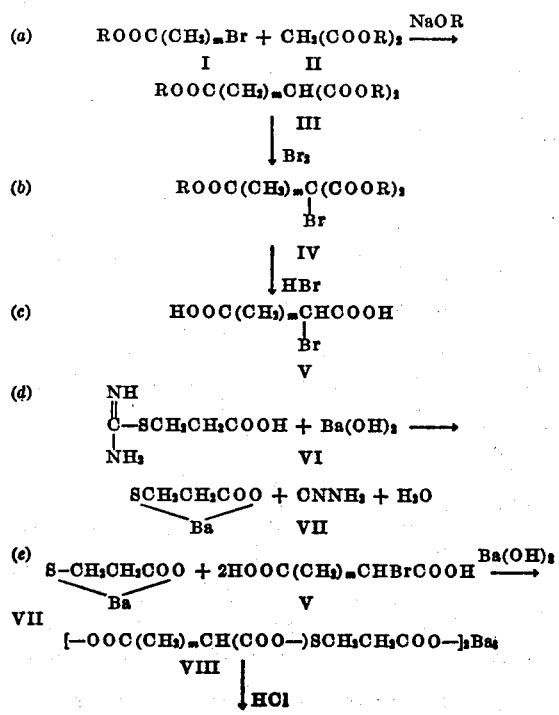

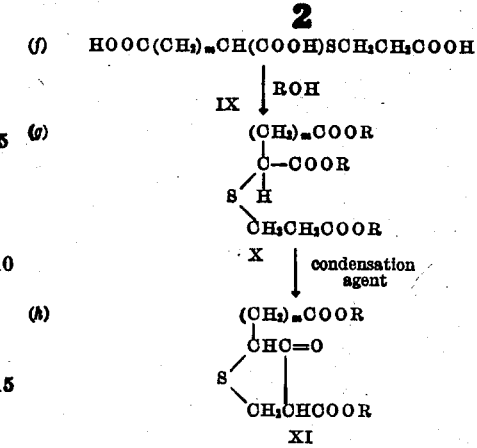

Example (a) *1,1,5-tricarbethoxypentane.*—This product (represented by Formula III where R is $C_2H_5$ and $m$ is 4) is prepared by condensing ethyl delta-bromo-n-valerate (I) with diethyl malonate (II) using sodium ethylate in an alcoholic reaction medium in accordance with standard practices. The following detailed example will serve for illustrative purposes:

About 11.5 grams of clean sodium is first added in small pieces to 500 cc. of freshly distilled absolute alcohol, and to the resulting solution is added with mechanical stirring, about 85 cc. of diethyl malonate. To this solution is next added, with continued stirring, about 104.5 grams of ethyl-δ-bromo-valerate, and the resulting reaction mixture, stirred and heated to gentle refluxing for about two hours, or until practically neutral. The reaction mixture is then worked up in the usual manner for malonic esters and the product distilled under reduced pressure. It boils at about 147°–149° C. at 3 mm. pressure.

(b) *1 - bromo-1,1,5 - tricarbethoxypentane.*—The product (represented by Formula IV) is prepared by bromination of the ester (III) obtained in (a) above, with dry bromine in an inert solvent such as carbon tetrachloride, in accordance with standard practices. The following detailed example will serve for illustrative purposes:

About 109 grams of 1,1,5-tricarbethoxypentane is dissolved in 100 cc. of carbon tetrachloride, and 22 cc. of dry bromine dropped in from a dropping funnel with stirring. A light is held below the flask for a short time to initate the reaction, after which it proceeds spontaneously. After all the bromine is added, the solution is refluxed for two hours to complete the reaction. The reaction mixture is then subjected to preliminary distillation at atmospheric pressure, to remove the solvent, and the desired product then distilled under reduced pressure. It boils at 162°–165° C. at 3.5 mm. pressure.

(c) *α-bromopimelic acid.*—This product (V) is prepared by heating about 126 grams of the bromo product (IV) obtained in (b) above, with 50 cc. of 48 per cent hydrobromic acid. The heating is carried out under a column arranged for slow removal of the alcohol formed in the reaction by regulation of the temperature at the top of the column. After hydrolysis and decarboxylation are complete (e. g. 8 hours), the reaction solution (termed solution No. 1) is ready for use with solution No. 2 prepared as outlined below.

(d) *Barium salt of β-mercaptopropionic acid.*—This product (VII) is prepared by reacting about 48 grams of β-carboxyethyl-isothiourea (VI) with 284 grams of crystalline barium hydroxide in about 800 cc. of hot, freshly boiled water. The mixture is stoppered and shaken for about 15 minutes. In some cases, longer time of reaction or further warming is necessary to complete the reaction. This may be determined by acidifying an aliquot with acetic acid and titrating with standard iodine solution to ascertain whether there is approximately the theoretical amount of mercapto (—SH) present, i. e. to ascertain whether the reaction is complete. The resulting composition is solution No. 2, and contains sufficient available barium (excess barium hydroxide) to combine with all the acid groups of solution No. 1 of (c) above.

(e) *Barium salt of α-(β'-carboxyethylthio)-pimelic acid.*—This product (VIII) is prepared by mixing solution No. 1 (containing product V) with solution No. 2 (containing product VII) while cooled in ice. After standing for about 1–3 hours at room temperature, the reaction is complete. This may be ascertained by titrating with iodine, i. e. when no iodine is absorbed the mixture is free from mercapto groups and the reaction is complete. In place of the salt of β-mercaptopropionic acid (product VII) the free acid may be used, although as the reaction takes place in the presence of an alkaline hydroxide the salt is formed in situ in the reaction mixture.

(f) *α - (β'-carboxyethylthio) - pimelic acid.*—This product IX is prepared by acidifying the reaction mixture of (e) above with a slight excess of hydrochloric acid, and extracting the desired free acid by ether in a continuous extractor. The product obtained after evaporation of the ether is a liquid which may be distilled at about 210° C. at 2.5 mm. As high temperatures cause some decomposition, it is generally preferred not to distill but to heat the ether-free residue under vacuum only up to about 175° C. This treatment removes moisture and low-boiling impurities and the composition remaining may then be esterified, as described below.

(g) *α-(β'-carboxyethylthio)-pimelic acid triethyl ester.*—This product X is prepared by dissolving the impure free acid product obtained in (f) above in an excess of ethyl alcohol (about 200 cc. on proportions employed in (c) and (d) above), the resulting solution cooled in ice and saturated with dry hydrogen chloride. The mixture is next stoppered and allowed to stand at room temperature for about 2–4 days. The excess alcohol and hydrogen chloride are removed by evaporation, the residue treated with sodium carbonate solution to give a faintly alkaline reaction, and the desired ester shaken out in the usual manner with ether. The ether solution is next dried over anhydrous sodium sulfate, the ether evaporated and the dry ester residue then distilled under vacuum at about 190°–195° C. at 3.5 mm.

(h) *2-(δ-carbethoxybutyl) - 3-oxo-4-carbethoxytetrahydrothiophene.*—This product XI is prepared as follows by intramolecular condensation. About 8.5 grams of sodium (under dry ether) is first mixed with an equivalent (about 22.5 cc.) of absolute ethyl alcohol, and the mixture stirred to produce the desired sodium ethylate. The resulting suspension is ice-cooled and about 60 grams of the ester product of (g) above is then added gradually with stirring. After cooling and stirring for about four hours, the reaction mixture is allowed to stand over-night at room temperature.

The reaction mixture is next poured into an ice mixture containing slightly over one molecular equivalent of acetic acid. The upper ether layer is separated and is then extracted with several portions (e. g. 5 or 6 50 cc. portions) of about 5 per cent potassium hydroxide solution, and the extracts poured at once into an ice mixture containing a slight excess of acetic acid. The resulting mixture is extracted with carbon tetrachloride and the resulting extract shaken with a small amount of saturated sodium carbonate solution to remove acid. The carbon tetrachloride solution is dried over anhydrous sodium sulfate, the solvent removed by distillation, and the crude product remaining purified by distillation under reduced pressure. The desired tetrahydrothiophene boils at about 173°–177° C. at 6 mm. pressure.

The ester product obtained in step (g) above may be represented by the following formula:

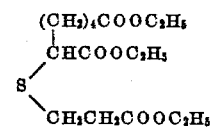

and the final 4-carbalkoxytetrahydrothiophene obtained in step (h) above may be represented by the following formula:

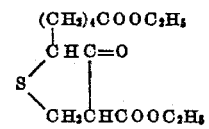

In the above process the bromo-valerate may be replaced by other halo-fatty acid esters such as methyl chloro-acetate, propyl β-bromo-propionate, ethyl γ-bromo-butyrate, methyl ε-chloro-caproate, ethyl bromo-pelargonate, etc. The barium hydroxide may also be replaced by other alkaline earth metal hydroxides—as well as the alkali metal hydroxides—although barium hydroxide is preferred due to high yields. Esterification may be carried out with any lower alcohol such as methyl, propyl, butyl, amyl, etc. alcohols.

The condensation may be carried out with alkali metals or with sodium triphenyl methyl, potassium tertiary butoxide or other Claisen type condensation agents made up of an alkali metal—weakly acidic radical. Examples of other suitable agents are the Na and K amides ($NH_2$) and alkali metal—OR, where R is a lower alkyl group such as methyl, isopropyl, tertiary butyl, etc.

It will be understood that the present invention is not limited to the above illustrative examples. All modifications of the present invention are intended to be covered by the claims annexed hereto.

We claim:

1. A product represented by the following formula:

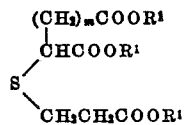

where $R^1$ is selected from the group consisting of hydrogen and lower alkyl groups, and $m$ represents a small whole number from 2 to 10.

2. A product represented by the following formula:

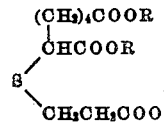

where R represents a lower alkyl group.

3. The product of claim 2 where R is an ethyl ($C_2H_5$) group.

4. The process which comprises reacting the ingredients represented by the following formulas:

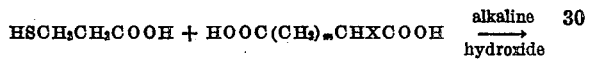

to form the alkaline salt of the acid represented by the following formula:

$$HOOC(CH_2)_mCH(COOH)SCH_2CH_2COOH$$

where $m$ represents a small whole number from 2 to 10 and X represents a halogen atom.

5. In the process of preparing $\alpha$-($\beta$-carboxyethylthio)-pimelic acid, the improvement which consists in reacting the barium salt of $\beta$-mercaptopropionic acid with $\alpha$-bromopimelic acid in an aqueous barium hydroxide reaction mixture, and then acidifying the reaction mixture.

6. The process which comprises reacting the ingredients represented by the following formulas:

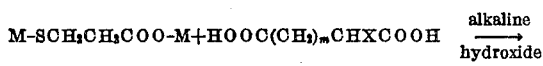

to form an alkaline salt of the acid represented by the following formula:

$$HOOC(CH_2)_mCH(COOH)SCH_2CH_2COOH$$

where $m$ represents a small whole number from 2 to 10 and X represents a halogen atom and M represents a metallic ion.

MARJORIE B. MOORE.
EDMOND E. MOORE.

REFERENCES CITED

The following references are of record in the file of this patent:

UNITED STATES PATENTS

| Number | Name | Date |
|---|---|---|
| 2,416,100 | Karrer | Feb. 18, 1947 |

OTHER REFERENCES

Beilstein: "Organische Chemie," 4th ed., 1942, vol. 3, Supp. 2, pages 287–288.